US009697859B1

(12) United States Patent
Tripathy et al.

(10) Patent No.: US 9,697,859 B1
(45) Date of Patent: Jul. 4, 2017

(54) HEAT-ASSISTED MAGNETIC RECORDING (HAMR) MEDIUM INCLUDING A BI-LAYER THAT ENABLES USE OF LOWER LASER CURRENT IN WRITE OPERATIONS

(71) Applicant: WD Media, LLC, San Jose, CA (US)

(72) Inventors: Debashish Tripathy, San Jose, CA (US); Kumar Srinivasan, Redwood City, CA (US); Antony Ajan, San Jose, CA (US)

(73) Assignee: WD MEDIA, LLC, San Jose, CA (US)

( * ) Notice: Subject to any disclaimer, the term of this patent is extended or adjusted under 35 U.S.C. 154(b) by 0 days.

(21) Appl. No.: 15/089,145

(22) Filed: Apr. 1, 2016

(51) Int. Cl.
| G11B 11/00 | (2006.01) |
| G11B 5/70 | (2006.01) |
| G11B 5/84 | (2006.01) |
| G11B 5/00 | (2006.01) |

(52) U.S. Cl.
CPC .......... G11B 5/7013 (2013.01); G11B 5/8404 (2013.01); *G11B 2005/0021* (2013.01)

(58) Field of Classification Search
None
See application file for complete search history.

(56) References Cited

U.S. PATENT DOCUMENTS

| 5,981,017 | A | 11/1999 | Agarwal et al. |
| 8,509,039 | B1 | 8/2013 | Huang et al. |
| 8,530,065 | B1 | 9/2013 | Chernyshov et al. |
| 8,576,672 | B1 | 11/2013 | Peng et al. |
| 8,605,555 | B1 | 12/2013 | Chernyshov et al. |
| 8,743,666 | B1 | 6/2014 | Bertero et al. |
| 8,811,129 | B1 | 8/2014 | Yuan et al. |
| 8,828,482 | B1 | 9/2014 | Ruffini et al. |
| 8,867,322 | B1 | 10/2014 | Chernyshov et al. |
| 8,941,950 | B2 | 1/2015 | Yuan et al. |
| 8,947,987 | B1 | 2/2015 | Wang et al. |
| 9,034,492 | B1 | 5/2015 | Mallary et al. |
| 9,047,880 | B1 | 6/2015 | Bertero et al. |
| 9,177,585 | B1 * | 11/2015 | Seki ............... G11B 5/7325 |
| 9,406,329 | B1 * | 8/2016 | Ho .................... G11B 5/66 |
| 2002/0037440 | A1 * | 3/2002 | Ono .................... G11B 5/72 428/835 |

(Continued)

OTHER PUBLICATIONS

Gerardo A Bertero, et al., U.S. Appl. No. 13/769,232, filed Feb. 15, 2013, 19 pages.

*Primary Examiner* — Peter Vincent Agustin
(74) *Attorney, Agent, or Firm* — Loza & Loza, LLP; Gabriel Fitch

(57) ABSTRACT

A heat-assisted magnetic recording (HAMR) medium includes a substrate, a bi-layer, a heat-sink layer, and a magnetic-recording layer. The bi-layer includes a seed layer disposed on the substrate, and a thermal-transport-control layer (TTCL) disposed on seed layer. The heat-sink layer is disposed on the TTCL; and the magnetic-recording layer is disposed on the heat-sink layer. The bi-layer is configured to enable use of a 50% thinner heat-sink layer that allows use of a reduced operating current of a laser in HAMR write operations while maintaining about the same write performance parameters as a HAMR medium that includes a thermal-barrier layer (TBL) and twice as thick heat-sink layer. A HAMR data-storage device that incorporates the HAMR medium within a HAMR disk, and a method for making the HAMR medium are also described.

21 Claims, 4 Drawing Sheets

(56) References Cited

U.S. PATENT DOCUMENTS

| | | | |
|---|---|---|---|
| 2005/0047015 A1* | 3/2005 | Matono | G11B 5/127 360/125.75 |
| 2005/0202287 A1 | 9/2005 | Lu et al. | |
| 2006/0154110 A1* | 7/2006 | Hohlfeld | B82Y 10/00 428/823 |
| 2007/0026263 A1* | 2/2007 | Kubota | G11B 5/65 428/832 |
| 2008/0026255 A1 | 1/2008 | Das et al. | |
| 2008/0224173 A1* | 9/2008 | Yuan | H01L 27/0605 257/194 |
| 2010/0123965 A1* | 5/2010 | Lee | G11B 5/314 360/59 |
| 2012/0052330 A1 | 3/2012 | Takekuma et al. | |
| 2013/0314815 A1* | 11/2013 | Yuan | G11B 5/65 360/59 |
| 2014/0057134 A1* | 2/2014 | Inaba | G11B 13/04 428/834 |

* cited by examiner

HEAT-ASSISTED MAGNETIC RECORDING (HAMR) MEDIUM INCLUDING A BI-LAYER THAT ENABLES USE OF LOWER LASER CURRENT IN WRITE OPERATIONS

BACKGROUND

Heat-assisted magnetic-recording (HAMR) is a recent technological development that is designed to increase the areal density (AD) of written data by recording data in a magnetic-recording medium having higher coercivity, $H_c$, than can be written by a magnetic field from a magnetic-recording head without assistance. By heating the surface of the magnetic-recording medium with a laser spot during write operations, coercivity of the magnetic-recording medium is reduced so that the magnetic field of the magnetic-recording head can record data in the magnetic-recording medium at high AD.

DETAILED DESCRIPTION

Figure 1:
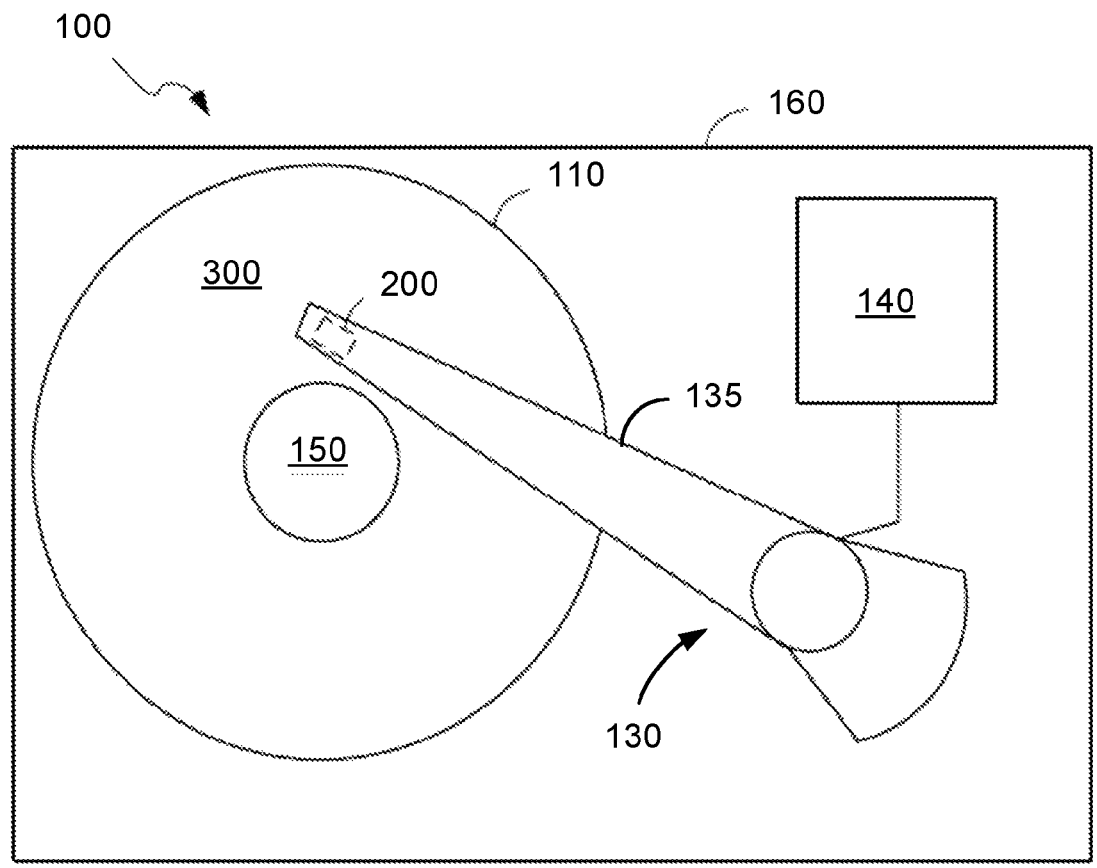
FIG. 1 is a top schematic view of a heat-assisted magnetic-recording (HAMR) data-storage device, by way of example, a disk drive, that includes a HAMR medium with a bilayer including a seed layer and a thermal-transport-control layer (TTCL), according to one embodiment.

To achieve magnetic data storage levels beyond 1 terabit per inch squared (1 Tb/in$^2$) for high AD recording in heat-assisted magnetic recording (HAMR), magnetic-recording media having small grain size, less than about 6 nanometer (nm), are employed. Such designs utilize high magnetic-anisotropy, $K_u$, materials for the magnetic-recording layer of the magnetic-recording medium, such as L1o ordered FePt alloys, to provide for thermal stability of the recorded bits in the magnetic-recording layer, which otherwise would demagnetize due to superparamagetism attending small magnetic grains having lesser $K_u$. Consequently, due to the high $K_u$, HAMR media are not writable with conventional magnetic-recording heads at ambient temperatures, but can be written if $H_c$ that depends on $K_u$ is reduced by heating the HAMR medium in a hot spot made by a laser on the HAMR medium. In addition, reduced $H_c$ at elevated temperatures enables much higher effective writing-field gradients than conventional perpendicular magnetic recording, because the effective writing-field gradient is defined by the product of thermal gradient (dT/dx) and slope of the temperature dependence of the anisotropy field (dH$_k$/dT). HAMR media, besides including a magnetic-recording layer, may also include a heat-sink layer positioned beneath the magnetic-recording layer to facilitate efficient writing of the HAMR medium with reduced laser power. Thermal energy is dissipated from the magnetic-recording layer with the aid of the heat-sink layer, "freezing in" the magnetization of a recorded bit in the magnetic-recording layer. However, heat-sink layers may not dissipate the thermal energy deposited by the laser in the magnetic-recording layer quickly enough for the best magnetic-recording characteristics.

Thermal design for HAMR media employs the combination of one or more layers with careful consideration given to thermal and optical properties of the heat-sink material. The objective of the thermal design is to obtain high thermal gradients in the cross-track and down-track directions. However, this is not to be achieved at the expense of thicker heat-sink layers that utilize higher laser power and have a detrimental effect on HAMR-head lifetime. Therefore, much effort has been dedicated towards tailoring the thermal design of HAMR media using a thermal-barrier layer (TBL), also referred to as a thermal resistor layer (TRL), to maximize SNR at reduced laser power in order to provide a pathway towards high AD and improved reliability. Throughout the following, a design using a TBL will be referred to herein as TBLHAMR design; a HAMR medium based on such a design, as a TBLHAMR medium; and a data-storage device utilizing such TBLHAMR media, as a TBLHAMR data-storage device.

While not bound by any particular theory, the thicknesses and thermal properties of both the TBL and the heat-sink layer are selected to ensure the highest thermal gradient per laser power that a HAMR head might sustain. An ideal heat-sink layer can have as high as possible thermal conductivity, κ, and an ideal TBL can have as low as possible κ. The latter ensures that a TBL is relatively thin and that lateral heat diffusion in the TBL is of limited extent. The optical properties of the TBL are also of interest. As observed experimentally, the magnetic-recording layer could generally absorb only a portion of light coming from a nearby near-field transducer (NFT); and therefore, a significant portion of incoming NFT and waveguide light could be absorbed in the TBL depending on its optical properties. The latter absorption effect would degrade both on-track and off-track HAMR media recording performance, especially if side lobes from a waveguide are present.

According to embodiments described herein, to minimize the above-described disadvantages associated with TBLHAMR media that include the TBL, a new thermal design that does not employ the TBL is used. By combining in a bilayer a seed layer with a thermal-transport-control layer (TTCL) comprising a Cu-based alloy whose composition is selected to tune thermal conductivity, embodiments described herein reduce the total heat-sink layer thickness of HAMR media by 40 percent (%) to 50%, while achieving similar SNR and laser power as TBLHAMR media with a TBL. Moreover, according to embodiments described herein, a new thermal design based on the above-described bilayer also reduces the laser power for magnetic-recording in a HAMR medium that includes the bilayer. As a result, embodiments described herein eliminate the use of an oxide-based TBL that utilizes costly and maintenance-intensive radio-frequency (rf) sputtering for fabrication. Moreover, embodiments described herein significantly improve the manufacturability of a HAMR medium that includes the above-described bilayer.

Moreover, according to embodiments described herein, the new HAMR media structure that includes the bilayer including the seed layer and the TTCL utilizes a TTCL composed of one or more materials such that the thermal conductivity of the TTCL is between about 10% and about 400% of the thermal conductivity of the heat-sink layer. According to embodiments described herein, the bilayer can efficiently dissipate both heat from the laser and can also reduce the media surface roughness typically caused by an otherwise overly thick heat-sink layer. Since heat is efficiently dissipated, the associated HAMR laser power may be controlled and reduced. In one embodiment, with certain selected materials, the TTCL has thermal conductivity of about 10 watt per meter Kelvin (W/mK), which is less than that of the heat-sink layer of about 117 W/mK, and is capable of reducing Ra, or waviness, caused by the heat-sink layer. In another embodiment, with the other selected materials, the TTCL has thermal conductivity of about 400 W/mK, which is greater than that of the heat-sink layer of about 117 W/mK, and is capable of reducing Ra, or waviness, caused by the heat-sink layer. Therefore, according to embodiments described herein, the thermal conductivity of the TTCL may be adjusted according to the design selected for the HAMR medium.

In HAMR media, an amorphous underlayer (AUL) may be deposited on the heat-sink layer, which can effectively reduce the roughness as measured by Ra caused by the heat-sink layer. Sputtering with a high bias voltage, for example, of about 300 volts (V) is effective in producing such an AUL. In some of the comparative designs, a 10 nm thick AUL is generally capable of reducing the surface roughness to an acceptable level. However, a thinner AUL, for example, less than 10 nm, shows degradation in performance due to waviness. According to an embodiment, the thickness of the heat-sink layer may be reduced by use of a TTCL with a well-chosen composition and corresponding thermal conductivity so that degradation in performance due to waviness can be abated. According to another embodiment, the composition and crystallographic orientation of the seed layer may be chosen so that degradation in performance due to waviness can also be abated.

The terms "on," "above," "below," and "between" as used herein refer to a relative position of one layer with respect to another layer or other layers. As such, one layer deposited or disposed on, above or below another layer may be directly in contact with the other layer or may have one or more intervening layers that lie between it and the other layer or layers. Moreover, one layer deposited or disposed between layers may be directly in contact with the layers or may have one or more intervening layers that lie between it and the other layer or layers.

It shall be appreciated by those skilled in the art, in view of the present disclosure, that although various example embodiments are discussed herein within the environment of magnetic-recording disks, the embodiments, with or without some modifications, may be used for other types of magnetic-recording media environments associated with other types of data-storage devices, by way of example without limitation thereto, a magneto-optical recording disk for a magneto-optical disk drive, or magnetic-recording tape for a magnetic tape drive. It shall be further appreciated by those skilled in the art, in view of the present disclosure, that in lieu of the full names of chemical elements, the well-known symbols for chemical elements may be used herein to designate one or more chemical elements in the interest of brevity and clarity.

Figure 2:
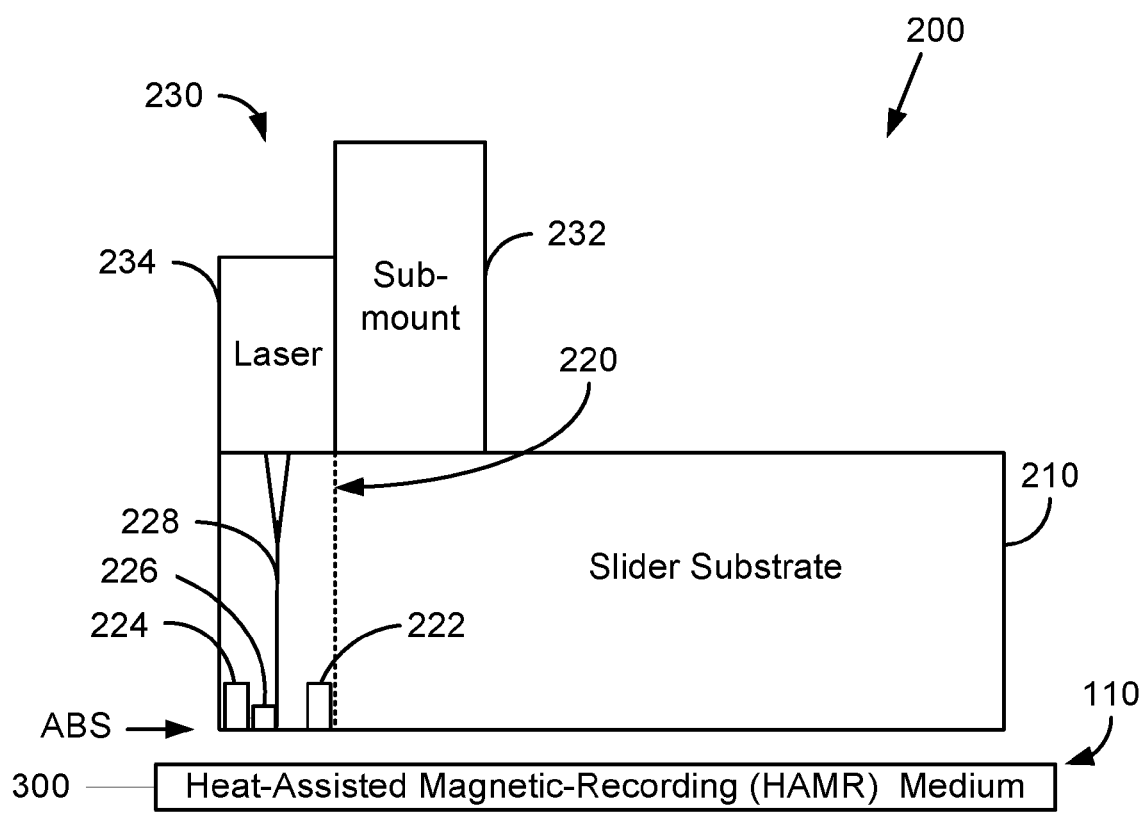
FIG. 2 is a cross-sectional schematic view of selected components of the HAMR data-storage device of FIG. 1, showing a HAMR head disposed to write data to, and/or to read data from, the HAMR medium with the bilayer that includes the seed layer and the TTCL, according to one embodiment.
Figure 3:
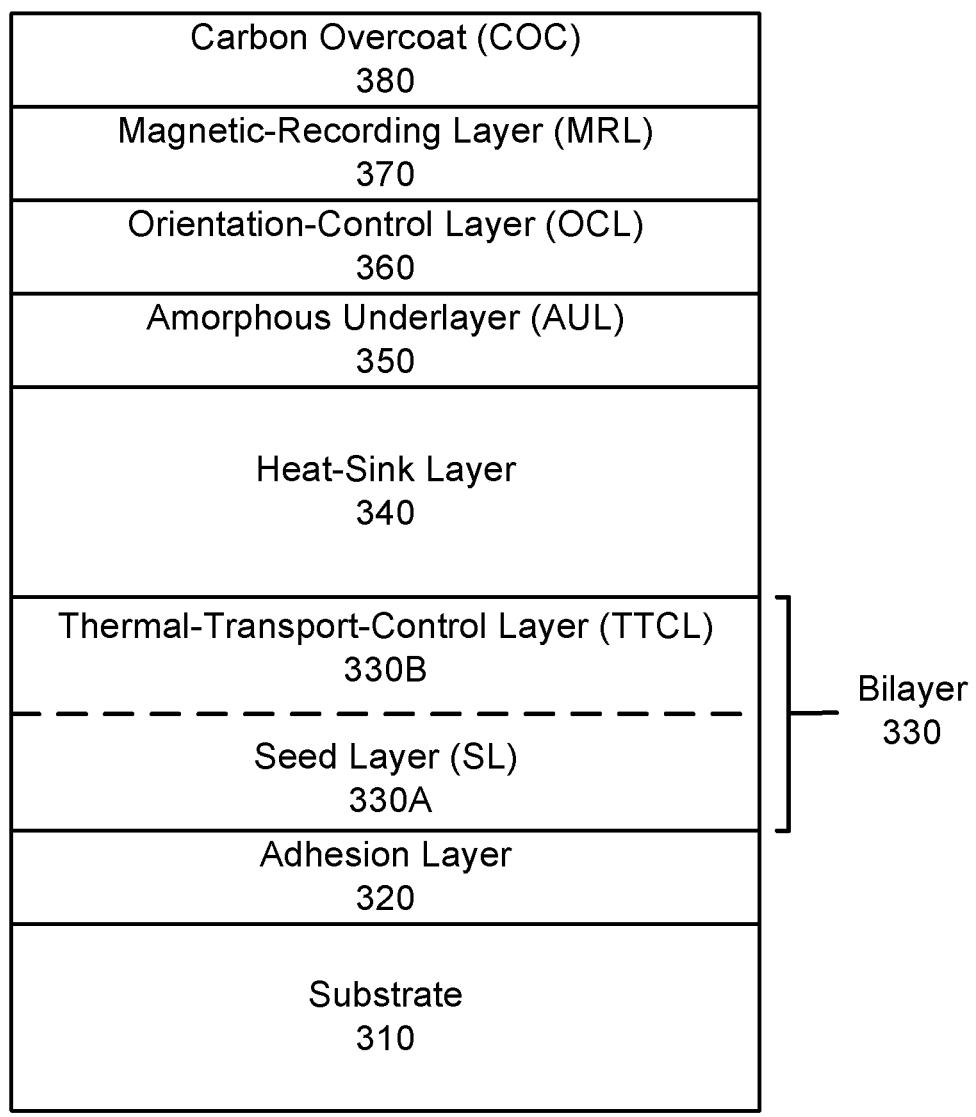
FIG. 3 is cross-sectional view of the HAMR medium with the bilayer that includes the seed layer and the TTCL, according to one embodiment.

With reference now to FIG. 1 and FIGS. 2 and 3, according to an embodiment, a schematic drawing is shown of the HAMR data-storage device 100, by way of example without limitation thereto, a disk drive configured for heat-assisted magnetic recording (HAMR). According to an embodiment, a HAMR medium 300 is incorporated into the HAMR disk 110, and therefore, HAMR data-storage device 100. According to an embodiment, the HAMR data-storage device 100 includes at least one HAMR disk 110 and at least one HAMR slider 200 associated therewith. The HAMR disk 110 is disposed on a spindle assembly 150 that is mounted in a drive housing 160. Referring briefly to FIG. 3, according to an embodiment, the HAMR disk 110 includes the HAMR magnetic-recording medium 300 that includes the bi-layer 330, including the seed layer 330A disposed on a substrate 310, and the TTCL 330B disposed on the seed layer 330A. Data may be stored in a magnetic-recording layer 370 along tracks of the HAMR disk 110. As shown in FIG. 2 according to an embodiment, the HAMR slider 200 includes a HAMR head 220 that is configured to write, as well as to retrieve, such data. According to an embodiment, the HAMR slider 200 is configured to fly over the HAMR disk 110 to reach a track where data is to be stored and/or retrieved. According to an embodiment, the HAMR head 220 includes a read element 222 and a write element 224 (not shown in FIG. 1 but see FIG. 2). According to an embodiment, the HAMR head 220 may have a magneto-resistive (MR) sensor, a giant magneto-resistive (GMR) sensor, or a tunneling magneto-resistive (TMR) sensor, as a read element 222. The write element 224 is configured to write data to the HAMR disk 110 in a track where data is to be stored with the aid of a NFT 226 supplied with light from a laser 234 by means of a waveguide (WG) 228 (not shown in FIG. 1 but see FIG. 2); and, the read element 222 is configured to read data from the HAMR disk 110 from a track where data has been stored.

With further reference to FIGS. 1-3, according to an embodiment, HAMR slider 200 is disposed at the distal end of an actuator arm 135 of an actuator 130. The radial position of the HAMR slider 200 relative to the HAMR disk 110 may be controlled by position control circuitry 140, which controls the actuator 130 and, thereby, the radial position of the actuator arm 135 and HAMR slider 200 over a particular track of the HAMR disk 110. The HAMR data-storage device 100 also includes a spindle motor (not shown) that rotates the spindle assembly 150 and, thereby, the HAMR disk 110 to position a portion of the track under the HAMR slider 200 at a particular circumferential location where data is to be recorded on, or retrieved from, the HAMR disk 110. According to an embodiment, the HAMR data-storage device 100 may be, by way of example without limitation thereto, a hard-disk drive (HDD) that includes the various components of the HAMR data-storage device 100 described above. Although only a single HAMR disk 110 and a single HAMR slider 200 are shown in FIG. 1, the HAMR data-storage device 100 may include a plurality of HAMR disks 110 and a plurality of HAMR sliders 200, and corresponding pluralities of matching components, similar to those described above, to store and/or to retrieve data. Also, other components of the HAMR data-storage device 100 that are generally known in the art and not necessary for understanding FIG. 1, have been omitted for conciseness and clarity from the drawing of FIG. 1 and the preceding description, but may be considered to be within the scope of embodiments.

With reference now to FIG. 2 and FIGS. 1 and 3, according to an embodiment, a cross-sectional schematic view is shown of selected components of the HAMR data-storage device 100 of FIG. 1, viz., the HAMR slider 200 and the HAMR magnetic-recording medium 300. For clarity, FIG. 2 is not to scale. For simplicity not all portions of the HAMR data-storage device 100 are shown. Additional and/or different components may be included in the HAMR data-storage device 100. The HAMR slider 200 includes the slider substrate 210, the HAMR head 220, and the chip-onsubmount assembly (COSA) 230. The HAMR magnetic-recording medium 300 may be incorporated into a HAMR disk 110. The COSA 230 includes a submount 232 and a laser 234. The submount 232 is a substrate to which the laser 234 may be affixed for improved mechanical stability, ease of manufacturing and better robustness. The laser 234 may be a chip such as a laser diode. As shown in FIG. 2, by way of example, according to an embodiment, without limitation thereto, portions of COSA 230, the laser 234 and the submount 232, are disposed on the HAMR head 220 and the slider substrate 210, respectively; but, variations in the precise location of the laser 234 and the submount 232 affecting the relative position of the laser 234 and the submount 232 with respect to HAMR head 220 and the slider substrate 210 are also within the scope of embodiments. According to one embodiment, by way of example without limitation thereto, the laser 234 is disposed on the HAMR head 220; and, the laser 234 is configured to raise the temperature of the HAMR medium 300 to reduce the coercivity, $H_c$, thereof at a location on the HAMR disk 110 whereat the write element 224 writes data.

With further reference to FIGS. 1-3, according to an embodiment, the HAMR head 220 is fabricated on the slider substrate 210 and includes an air-bearing surface (ABS) proximate to the HAMR magnetic-recording medium 300 during use. In general, the HAMR head 220 includes a write element 224 and a read element 222. The HAMR head 220 also includes a waveguide (WG) 228 and a near-field transducer (NFT) 226. WG 228 guides light from the laser 234 to the NFT 226, which resides near the ABS. The NFT 226 utilizes local resonances in surface plasmons to direct the light into an optical spot localized on the surface of the HAMR medium 300. At resonance, the NFT 226 couples the optical energy of the surface plasmons efficiently into the HAMR magnetic-recording medium 300 within a confined optical spot, which is much smaller than the optical diffraction limit determined by the wavelength of the light. This optical spot can rapidly heat a region of the HAMR magnetic-recording medium 300 to near or above the Curie point of the magnetic-recording layer 370 (not shown in FIG. 1-2, but see FIG. 3). Bits can be written on the HAMR medium 300 at high AD wherein a high coercivity, $H_c$, of the magnetic-recording layer 370 at ambient temperature is lowered within the optical spot thereby enabling the write element 224 to write data to the magnetic-recording layer 370 with a nominal magnetic field characteristic of the magnetic material of the write element 224 when saturated by a write current. The write element 224 is formed of magnetic materials, by way of example without limitation thereto, CoFe, having a high saturation magnetization. Therefore, according to an embodiment, the HAMR medium 300 has utility for the recording of data at the high ADs used in the HAMR data-storage device 100.

With reference now to FIG. 3, according to one embodiment, a cross-sectional view of the HAMR medium 300 with the bilayer 330 that includes the seed layer 330A and the thermal-transport-control layer (TTCL) 330B is shown. According to an embodiment, the HAMR medium 300 has a stacked structure with a substrate 310 at the base, an adhesion layer 320 disposed on the substrate 310, the bilayer 330 disposed on the adhesion layer 320, a heat-sink layer 340 disposed on the bilayer 330, an amorphous underlayer (AUL) 350 disposed on the heat-sink layer 340, an orientation-control layer 360 disposed on the AUL 350, a magnetic-recording layer 370 disposed on the orientation-control layer 360, and a carbon overcoat (COC) 380 disposed on the magnetic-recording layer 370. As used herein, the term, "disposed on," may refer to referenced layer(s) and/or element(s) of the structure of the HAMR medium 300 that are positioned above other layer(s) and/or element(s), for example, as shown in FIG. 3, but may, or may not, be directly in contact with the other layer(s) and/or element(s). The referenced layer(s) and/or element(s) may be so positioned such that one or more intervening layer(s) and/or element(s) may lie between the referenced layer(s) and/or element(s) and the other layer(s) and/or element(s) that the referenced layer(s) and/or element(s) are "disposed on."

With further reference to FIG. 3, according to some embodiments, the adhesion layer 320, the AUL 350, and/or the orientation-control layer 360 may be individually, collectively, or pairwise absent from the structure of HAMR medium 300. Therefore, according to an embodiment, the magnetic-recording medium for heat assisted magnetic recording (HAMR), referred to herein as the HAMR medium 300, includes at least the following: a substrate 310, a bi-layer 330 that includes a seed layer 330A disposed on the substrate 310 and a TTCL 330B disposed on the seed layer 330A, a heat-sink layer 340 disposed on the TTCL 330B, and a magnetic-recording layer 370 disposed on the heat-sink layer 340, without limitation thereto. Thus, according to an embodiment, the HAMR medium may further include the following: the adhesion layer 320 disposed between the substrate 310 and the bi-layer 330, an AUL 350 disposed on the heat-sink layer 340, an orientation-control layer 360 disposed between AUL 350 and the magnetic recording layer 370, and the COC 380 disposed on the magnetic recording layer 370. In another embodiment, a layer of lubricant (not shown), also referred to as a "lube layer," may be disposed on the COC 380.

With further reference to FIG. 3, according to some embodiments, the substrate 310 can be made of one or more materials such as an Al alloy, NiP plated Al, glass, glass ceramic, and combinations thereof. In one embodiment, the adhesion layer 320 can include one or more materials such as CrTi, CrTa, NiTa, CoCrTaZr, CoFeZrBCr, CoTaZr, CoFeTaZr, CoCrWTaZr, CoCrMoTaZr, CoZrWMo, and combinations thereof.

With further reference to FIG. 3, according to an embodiment, the seed layer 330A and the TTCL 330B make up the bilayer 330. According to an embodiment, the seed layer 330A is disposed on the adhesion layer 320. According to some embodiments, the seed layer 330A includes a material selected from the group consisting of Ni, Ru and combinations thereof. According to an embodiment, the TTCL 330B is disposed on the seed layer 330A. According to some embodiments, the TTCL 330B of the bilayer 330 includes CuX, wherein X is selected from the group consisting of Ni, Si, Cr, Zr, Mg, Ag, Zn, Sn and combinations thereof. According to other embodiments, the TTCL 330B includes CuX, wherein X is selected from the group consisting of $SiO_2$, $SiO_x$, $HfO_2$, $ZrO_2$, $TiO_2$, $TiO_x$, $Ta_2O_5$, $TaO_x$, $WO_3$, $WO_x$, and combinations thereof. Note that the subscript, "x," denotes an arbitrary amount of oxygen in an oxide compound, not necessarily a stoichiometric value, which might be produced in for example a thin-film deposition process, such as sputtering. According to some embodiments, the amount of the alloying constituent X in the alloy CuX of the TTCL 330B of the bilayer 330 may range from about 20 atomic percent (No) to about 25 A/o for elemental alloying constituents recited above, and about 20 molar percent (M/o) to about 25 M/o for the oxide-compound alloying constituents recited above. According to an embodiment, the Cu portion of the TTCL 330B has a substantially face-centered cubic (FCC) crystal structure, and a (111) preferred orientation. Alternatively, according to an embodiment, the Cu portion of the TTCL 330B may have a substantially FCC crystal structure, and a (100) preferred orientation. The (100) preferred orientation of the Cu portion of the TTCL 330B can serve as an epitaxial template for the material of the heat-sink layer 340, for example, hexagonal close packed (HCP) ruthenium (Ru), for growth of the heat-sink layer 340 with a preferred orientation. According to an embodiment, a thickness of the bi-layer 330 is about 20% of a thickness of the heat-sink layer 340. According to an embodiment, a thickness of the bi-layer 330 is less than about 100 nanometers (nm), and a thickness of the heat-sink layer 340 is between about 44 nm and about 55 nm. However, in other embodiments, the seed layer 330A may have a thickness of from about 4 nm to about 12 nm, and the TTCL 330B may have a thickness of from about 2 nm to about 10 nm, so that the bilayer 330 may have a total thickness of from about 6 nm to about 22 nm.

With further reference to FIG. 3, in one embodiment, the heat-sink layer 340 can be made of one or more materials such as Ag, Al, Au, Cu, Cr, Mo, Ru, W, CuZr, MoCu, AgPd, CrRu, CrV, CrW, CrMo, CrNd, NiAl, NiTa, and combinations thereof. In several embodiments, the TTCL 330B has a thermal conductivity of between about 10% and about 400% of the thermal conductivity of the heat-sink layer 340. According to embodiments, the TTCL 330B has a thermal conductivity of between about 10 W/mK and about 400 W/mK. By comparison, according to an embodiment, the thermal conductivity of a heat-sink layer 340 comprising, by way of example without limitation thereto, the material, Ru, has a thermal conductivity of about 117 W/mK depending on its microstructure, crystallographic orientation, and alloying constituent content.

With further reference to FIG. 3, in several embodiments, the AUL 350 can include one or more materials such as CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein, if X is present, X can be SiO2 and/or ZrO2. In another embodiment, the AUL 350 can include one or more materials such as CrTi, CrTa, NiTa, CoCrTaZr, CoFeZrBCr, CoTaZr, CoFeTaZr, CoCrWTaZr, CoCrMoTaZr, CoZrWMo, and combinations thereof, without the alloying constituent X, as recited above. In an embodiment, the AUL 360 may have a thickness of about 10 nm, having an amorphous, non-crystalline microstructure, which prevents the heat-sink layer 340 with relatively larger grain size acting as a seed layer for the growth of the orientation-control layer 360. In one embodiment, the orientation-control layer 360 can be made of one or more materials such as Cr, Mo, NiAl, MgO, MgTiO, MgOC, MgTiON, TiC, TiN, Ag, CrMo, Pt, Pd, Ru, and combinations thereof. In an embodiment, the orientation-control layer 360 may comprise MgO having a thickness of about 4 nm, and having the halite structure with an (001) preferred orientation. In one embodiment, the magnetic-recording layer 370 can be made of one or more materials such as FePt, CoPt, and combinations thereof. According to embodiments, the constituents Ag, Cu, B, C, N and $SiO_2$, without limitation thereto, may serve as segregants that migrate to the grain boundaries of the grains of the magnetic-recording layer 370, so as to magnetically decouple neighboring grains in the magnetic-recording layer 370 to support high AD magnetic-recording therein. In another embodiment, the magnetic-recording layer 370 may be capped with a capping layer (not shown) comprising Co. In an embodiment, the combined total thickness of a magnetic-recording layer 370 and the capping layer may be about 10 nm, and the magnetic-recording layer 370 includes a material having an ordered L1o structure with an (002) preferred orientation, for example, FePt and/or CoPt, without limitation thereto. In another embodiment, the COC 380 that is disposed on the magnetic-recording layer 370 may be diamond-like carbon (DLC), without limitation thereto. In another embodiment, the COC 380 may have a thickness of from about 1.5 nm to about 4 nm, where a COC with a thickness of between 1.5 nm to about 2 nm may allow for improved magnetic-recording density compared to a thicker COC.

With further reference to FIGS. 1-3, according to an embodiment, the HAMR medium 300 may be incorporated into a HAMR disk 110, which includes the HAMR medium 300. According to another embodiment, the HAMR medium 300 may be incorporated into the HAMR data-storage device 100. According to an embodiment, the HAMR data-storage device 100 includes: a HAMR disk 110 that includes the HAMR medium 300, a HAMR slider 200 including a slider substrate 210 and configured to fly over the HAMR disk 110, and the HAMR head 220 disposed on the slider substrate 210, and a laser 234 disposed on the slider substrate 210. According to an embodiment, the HAMR head 220 includes a write element 224 configured to write data to the HAMR disk 110, and a read element 222 configured to read data from the HAMR disk 110. According to an embodiment, the laser 234 is configured to raise the temperature of the HAMR medium 300 to reduce the coercivity, $H_c$, thereof at a location on the HAMR disk 110 whereat the write element 222 writes data. According to an embodiment, the HAMR data-storage device 100 may be a hard-disk drive (HDD), without limitation thereto.

With further reference to FIG. 3, the HAMR medium 300 may be compared with an example TBLHAMR medium that utilizes a separate TBL. The example TBLHAMR medium does not include the bilayer 330; but, according to an embodiment, the HAMR medium 300 includes the bilayer 330 that includes the seed layer 330A and the TTCL 330B that is disposed between the heat-sink layer 340 and the substrate 310. Throughout the following discussion, the names of various layers in the respective structures of the example TBLHAMR medium and the HAMR medium 300 have at times been given acronyms for brevity and clarity. Also, as some of the elements, for example, layers, in the respective structures have the same name, note that elements without reference numbers refer to the structure of the example TBLHAMR medium, whereas elements with reference numbers refer to embodiments of the structure of HAMR medium 300. The example TBLHAMR medium includes a substrate at the base, an adhesion layer disposed on the substrate, a heat-sink layer disposed on the adhesion layer, a separate TBL disposed on the heat-sink layer, an AUL disposed on the heat-sink layer, an orientation-control layer (OCL) disposed on the AUL, a magnetic-recording layer (MRL) disposed on the OCL, and a carbon overcoat (COC) disposed on the MRL. In contrast, according to an embodiment, as shown in FIG. 3, the HAMR medium 300 may include the substrate 310 at the base, an adhesion layer 320 disposed on the substrate 310, the bilayer 330 disposed on the adhesion layer 320, a heat-sink layer 340 disposed on the bilayer 330, an AUL 350 disposed on the heat-sink layer 340, an OCL 360 disposed on the AUL 350, a MRL 370 disposed on the OCL 360, and a COC 380 disposed on the MRL 370. According to an embodiment, the bilayer 330 includes a seed layer (SL) 330A disposed on the substrate 310 and a TTCL 330B disposed on SL 330A.

A typical stack of the example TBLHAMR medium consists of the adhesion layer, the heat-sink layer to control the thermal response of the example TBLHAMR medium, the AUL, the OCL comprising a MgO seedlayer to serve as an epitaxial template for the growth of the MRL, the MRL comprising a granular FePt, and a thermally stable COC. The example TBLHAMR medium also incorporates the separate TBL comprising an oxide with low thermal conductivity sandwiched between the heat-sink layer and the AUL. Use of the example TBLHAMR medium enables laser power reduction with minimal signal-to-noise ratio (SNR) loss. The heat-sink layer of the TBLHAMR medium comprises a Ru film that is about 110 nm thick; and the separate TBL comprises a thin film composed of $Y_2O_3$ doped $ZrO_2$ that is about 2 nm thick. Alternatively, other oxide materials, such as, $SiO_2$ and $HfO_2$, might also be used for the separate TBL.

The overall thickness of the stacked structure of the HAMR medium 300 is substantially thinner than the stacked structure of the example TBLHAMR medium, because of the absence of the separate TBL and reduced thickness of the heat-sink layer 340 in the stacked structure of the HAMR medium 300. Also, since the HAMR medium 300 lacks the separate TBL, according to an embodiment, the bi-layer 330 is configured to enable use of a about 50% thinner heat-sink layer 340 that allows use of a reduced operating current of the laser 234 while maintaining about the same write performance parameters as the example TBLHAMR medium that includes the separate TBL and about twice as thick heat-sink layer. Therefore, according to an embodiment, the bi-layer 330 is configured to enable use of the heat-sink layer 340 that is about 50% thinner than a corresponding heat-sink layer of a TBLHAMR medium that includes a TBL, and the bi-layer 330 is configured to enable use of a reduced operating current of the laser 234 compared to a corresponding operating current of a corresponding laser of a TBLHAMR data-storage device, such that write performance parameters according to embodiments described herein are substantially the same as corresponding write performance parameters of the TBLHAMR medium written with the corresponding operating current of the corresponding laser, wherein in all other respects the TBLHAMR data-storage device is substantially the same as the HAMR data-storage device 100. According to an embodiment, the thickness of the bi-layer 330 is about 8 nm, which is less than about 100 nm, and the thickness of the heat-sink layer 340 is about 55 nm, which is between about 44 nm and about 55 nm. Therefore, according to an embodiment for HAMR medium 300, since the separate TBL is absent from the structure of the HAMR medium 300, and a thin bilayer 330, including the seed layer 330A and TTCL 330B, is inserted between the adhesion layer 320 and the heat-sink layer 340, the thickness of the heat-sink layer 340 comprising Ru could be reduced by 50% to 55 nm compared to the thickness of the heat-sink layer in the TBLHAMR medium. According to an embodiment, the additive element X in the TTCL 330B permits the engineering of the thermal conductivity of Cu—X to have a value of between about 10 W/mK and about 400 W/mK.

Moreover, according to an embodiment, as a result of the reduced thickness of the stacked structure of the HAMR medium 300 and the absence of the separate TBL from the structure of the HAMR medium 300, the roughness of the top of the heat-sink layer 340 of the HAMR medium 300 is substantially less than the roughness of the heat-sink layer of the example TBLHAMR medium. Furthermore, for the example TBLHAMR medium, since the roughness of the heat-sink layer (HSL) comprising Ru increases with thickness, which manifests itself in long range waviness of HSL/TBL/AUL interfaces (note that each slash symbol denotes an interface), there are adverse effects on the crystallographic orientation of the OCL comprising MgO, and consequently on the crystallographic orientation of the MRL comprising FePt, for which the OCL provides an epitaxial template. To overcome the waviness, for the example TBLHAMR medium, a thick AUL may be used, often at the expense of poorer thermal gradient, which adversely affects linear density of data recorded in the MRL of the example TBLHAMR medium. Therefore, embodiments of HAMR medium 300, as shown in FIG. 3, considerably improve the quality of the HSL 340/AUL 350 interface compared to the HSL/TBL/AUL interfaces of the example TBLHAMR medium, which can translate into improved linear density of data recorded in the MRL 370 of HAMR medium 300.

Figure 4:
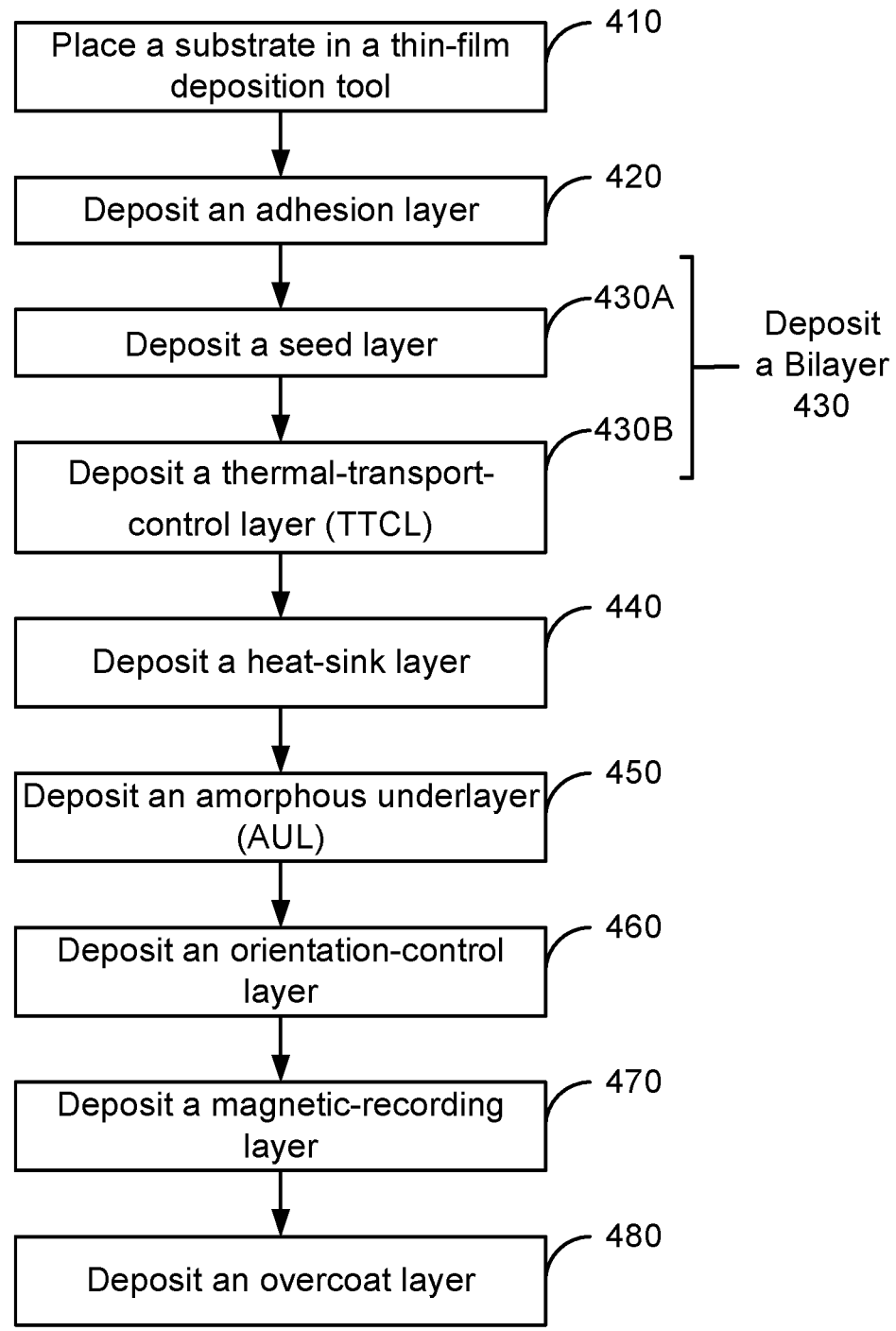
FIG. 4 is a flowchart of a process for manufacturing the HAMR medium with the bilayer that includes the seed layer and the TTCL, according to one embodiment.

With reference now to FIG. 4, according to one embodiment, a flowchart of a method 400 for manufacturing the HAMR medium 300 including a bilayer 330 that includes the seed layer 330A and the TTCL 330B is shown. In particular embodiments, the method 400 can be used to manufacture the HAMR medium 300 of FIGS. 1-3. As used in the following description of the method 400 and herein, the term, "deposited on," "depositing on," or "deposit on," may refer to referenced layer(s) and/or element(s) of the structure of the HAMR medium 300 that are formed above other layer(s) and/or element(s), for example, as shown in FIG. 3, but may, or may not, be directly in contact with the other layer(s) and/or element(s). The referenced layer(s) and/or element(s) may be so formed such that one or more intervening layer(s) and/or element(s) may lie between the referenced layer(s) and/or element(s) and the other layer(s) and/or element(s) that the referenced layer(s) and/or element(s) are "deposited on." At 410, according to an embodiment, the substrate 310 is placed in a thin-film deposition tool. At 430, according to an embodiment, a bi-layer 330 is deposited that includes, at 430A, depositing seed layer 330A on the substrate 310, and at 430B, depositing the TTCL 330B deposited on the seed layer 330A. At 440, according to an embodiment, the heat-sink 340 is deposited on the TTCL 330B; and, at 470, according to an embodiment, the magnetic-recording layer 370 is deposited on the heat-sink layer 340.

In a number of embodiments, the method 400 can manufacture the layers of the HAMR medium 300 with any of the numerous variations described above for the embodiments of FIGS. 1-3. For example, in one such case, the method 400 can also provide the adhesion layer 320 disposed between the substrate 310 and the seed layer 330A, the AUL 350 disposed on the heat-sink layer 340, the orientation-control layer 360 disposed between the AUL 350 and the magnetic-recording layer 370, and the COC 380 disposed on the magnetic recording layer 370. Therefore, at 420, according to an embodiment, the adhesion layer 320 is deposited on the substrate 310; at 450, according to an embodiment, the AUL 350 is deposited on the heat-sink layer 340; at 460, according to an embodiment, the orientation-control layer 360 is deposited on the AUL 350; and, at 480, according to an embodiment, the COC 380 is deposited on the magnetic-recording layer 370. In several embodiments, the layers can include the materials as described above.

In some embodiments, the method 400 deposits the TTCL 330B by applying a bias voltage of about −50V to −450V to the substrate. In another embodiment, the TTCL 330B is deposited at a pressure of less than 5 milliTorr (mTorr) in an atmosphere selected from the group consisting of Argon (Ar) gas and a mixture of Ar gas and nitrogen gas, $N_2$, the mixture determined by a flow rate of $N_2$ gas of between about 2% to 10% of the total combined gas flow rate of Ar and $N_2$ gases together. In another embodiment, the Cu portion of the TTCL 330B is deposited to have a substantially face-centered cubic (FCC) crystal structure, and a (111) preferred orientation. In yet another embodiment, the Cu portion of the TTCL 330B is deposited to have a substantially face-centered cubic (FCC) crystal structure, and a (100) preferred orientation.

In one embodiment, the process can perform the sequence of actions in a different order. In another embodiment, the process can skip one or more of the actions. In other embodiments, one or more of the actions are performed simultaneously. In some embodiments, additional actions can be performed.

In addition, a study comparing the magnetic properties of HAMR medium 300 with different thermal designs was performed. According to various embodiments, for HAMR medium 300, the thickness of the seed layer 330A was varied from 4 nm to 12 nm, while the thickness of TTCL 330B was varied from 2 nm to 10 nm. No impact on the magnetic properties of HAMR medium 300 was found. In particular, the magnetic coercivity, $H_c$, of HAMR medium 300 was found to be insensitive to the thickness of the seed layer 330A.

Having established comparable magnetic properties for HAMR medium 300 to those of the example TBLHAMR medium, magnetic-recording performance was subsequently evaluated. All measurements were taken in the saturated state at magnetic write width at 6T (MWW6T)=3.0 microinches (pin), the dependence of laser current for laser 234 for various thermal designs of the HAMR medium 300 were studied. (Note that the symbol "6T" denotes a measurement at a linear density of about 333 kiloflux reversals per inch (kfci).) Both HAMR medium 300 and the example TBLHAMR medium were found to use 4 milliAmps (Ma) less laser current compared to another reference HAMR medium including neither the bilayer 330, nor the separate TBL, respectively. The weighted-sum final SNR (wsSNRfinal) trade-off for laser current reduction for both HAMR medium 300 and the example TBLHAMR medium is in the range of 0.3-0.4 dB compared to the HAMR medium including neither the bilayer 330, nor the separate TBL. (Note that the wsSNRfinal denotes a measurement of the wsSNR, after tracks adjacent to the track on which wsSNR measurement is made have been repeatedly written a number of times, in the present example, about ten times. The side writing from adjacent tracks degrades the signal from the track in between, which is reflected in a lower value of the wsSNRfinal compared to a wsSNRinitial from a track without adjacently written tracks.) Both HAMR medium 300 and the example TBLHAMR medium show comparable wsSNRfinal at the same laser current, even though heat-sink layer thickness for HAMR medium 300 is 40-50% less than the example TBLHAMR medium, or the HAMR medium including neither the bilayer 330, nor the separate TBL. Typically, a 50% reduction in heat-sink layer thickness for the example TBLHAMR medium, or the HAMR medium including neither the bilayer 330, nor the separate TBL, will result in a wsSNRfinal loss of more than 1.0 dB. The jitter of magnetic-recording transitions recorded in the HAMR medium 300 for a seedlayer 330A with thickness of about 8 nm to 12 nm was also found to be similar to the example TBLHAMR medium.

A study comparing the surface roughness of the HAMR medium 300 with the surface roughness of the example TBLHAMR medium and that of the HAMR medium including neither the bilayer 330, nor the separate TBL, was also performed. The media roughnesses of the example TBLHAMR medium and a HAMR medium including neither the bilayer 330, nor the separate TBL, were comparable. However, for HAMR medium 300, it was observed that the roughness of the HAMR medium 300 increased monotonically with the thickness of TTCL 330B. For the thinnest TTCL 330B having a thickness of about 2 nm, the roughness of the HAMR medium 300 was found to be smoother compared to the example TBLHAMR medium and the HAMR medium including neither the bilayer 330, nor the separate TBL. Moreover, the roughness of the HAMR medium 300 with a seedlayer thickness of from about 4 nm to about 8 nm can be traded off to be made marginally lower than the roughness of the example TBLHAMR medium for a further improvement in the magnetic performance of the HAMR medium 300.

In addition, a study comparing the crystallographic texture of the magnetic-recording layers of the HAMR medium 300 with the crystallographic texture of the example TBLHAMR medium and that of the HAMR medium including neither the bilayer 330, nor the separate TBL, was performed. The crystallographic texture of the magnetic-recording layer 370 of the HAMR medium 300, the magnetic-recording layer of the example TBLHAMR medium and the magnetic-recording layer of the HAMR medium including neither the bilayer 330, nor the separate TBL, was quantified by measuring the X-ray diffraction (XRD) rocking curves of the FePt (002) reflections from the respective media. The full-width at half maximums (FWHMs) of FePt (002) reflections of the example TBLHAMR medium and the HAMR medium including neither the bilayer 330, nor the separate TBL, were found to be comparable at about 7.5° and about 7.3°, respectively. However, with increasing thickness of TTCL 330B of the HAMR medium 300 with a seedlayer thickness of from about 4 nm to about 8 nm, the FWHM of FePt (002) reflections was found to range from about 7.0° to about 8.4°, which indicates a lessening of the (002) preferred orientation in the crystallographic texture of the magnetic-recording layers 370 of the HAMR medium 300 with TTCLs 330B of increasing thickness. This effect might be attributed to increasing media roughness for thicker TTCLs 330B of the HAMR medium 300. However, the amount of (002) preferred orientation in the crystallographic texture of the magnetic-recording layers 370 of the HAMR media 300 with seedlayer thicknesses of from about 4 nm to about 8 nm can be traded off such that the FWHM of the (002) reflection can be made less than that of the example TBLHAMR medium, viz., as low as 7.0° compared to 7.5°, respectively, with an attendant further improvement in the magnetic performance of the HAMR medium 300.

While the above description contains many specific embodiments, these are not to be construed as limitations on the scope of the embodiments, but rather as examples of specific embodiments. Accordingly, the scope of the embodiments is not to be determined by the specific embodiments illustrated, but by the appended claims and their equivalents.

For example, in several embodiments, the deposition of such layers can be performed using a variety of deposition processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other deposition techniques known in the art may also be used.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple tasks or events may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A heat-assisted magnetic recording (HAMR) medium, comprising:
   a substrate;
   a bi-layer, comprising:
      a seed layer disposed on the substrate; and
      a thermal-transport-control layer (TTCL) disposed on the seed layer;
   a heat-sink layer disposed on the TTCL; and
   a magnetic-recording layer disposed on the heat-sink layer,
   wherein the TTCL comprises CuX, wherein X is selected from the group consisting of $SiO_2$, $SiO_x$, $HfO_2$, $ZrO_2$, $TiO_2$, $TiO_x$, $Ta_2O_5$, $TaO_x$, $WO_3$, $WO_x$, and combinations thereof.

2. The HAMR medium of claim 1, wherein the TTCL has a thermal conductivity of between about 10 Watt/meterKelvin (W/mK) and about 400 W/mK.

3. The HAMR medium of claim 1, wherein the TTCL has a thermal conductivity of between about 10 percent (%) and about 400% of the thermal conductivity of the heat-sink layer.

4. The HAMR medium of claim 1, wherein the TTCL further comprises a material selected from the group consisting of Ni, Si, Cr, Zr, Mg, Ag, Zn, Sn and combinations thereof.

5. The HAMR medium of claim 1, wherein the Cu portion of the TTCL has a substantially face-centered cubic (FCC) crystal structure, and a (111) preferred orientation.

6. The HAMR medium of claim 1, wherein the seed layer comprises a material selected from the group consisting of Ni, Ru and combinations thereof.

7. The HAMR medium of claim 1, wherein a thickness of the bi-layer is about 20% of a thickness of the heat-sink layer.

8. The HAMR medium of claim 1, wherein a thickness of the bi-layer is less than about 100 nanometers (nm), and a thickness of the heat-sink layer is between about 44 nm and about 55 nm.

9. The HAMR medium of claim 1, further comprising:
   an adhesion layer disposed between the substrate and the bi-layer;
   an amorphous underlayer (AUL) disposed on the heat-sink layer;
   an orientation-control layer disposed between the AUL and the magnetic recording layer; and
   an overcoat layer disposed on the magnetic recording layer.

10. The HAMR medium of claim 9:
    wherein the substrate comprises a material selected from the group consisting of an Al alloy, NiP plated Al, glass, glass ceramic, and combinations thereof;
    wherein the adhesion layer comprises a material selected from the group consisting of CrTi, CrTa, NiTa, CoCrTaZr, CoFeZrBCr, CoTaZr, CoFeTaZr, CoCrWTaZr, CoCrMoTaZr, CoZrWMo, and combinations thereof;
    wherein the seed layer comprises a material selected from the group consisting of Ni, Ru and combinations thereof;
    wherein the heat-sink layer comprises a material selected from the group consisting of Ag, Al, Au, Cu, Cr, Mo, Ru, W, CuZr, MoCu, AgPd, CrRu, CrV, CrW, CrMo, CrNd, NiAl, NiTa, and combinations thereof;
    wherein the AUL comprises a material selected from the group consisting of CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein, if X is present, X is selected from the group consisting of SiO2 and ZrO2;
    wherein the orientation-control layer comprises a material selected from the group consisting of Cr, Mo, NiAl, MgO, MgTiO, MgOC, MgTiON, TiC, TiN, Ag, CrMo, Pt, Pd, Ru, and combinations thereof;
    wherein the magnetic recording layer comprises a material selected from the group consisting of FePt, CoPt, and combinations thereof; and
    wherein the overcoat layer comprises C.

11. The HAMR medium of claim 1, wherein the HAMR medium is incorporated into a HAMR disk.

12. The HAMR medium of claim 1, wherein the HAMR medium is incorporated into a HAMR data-storage device, comprising:
    a HAMR disk;
    a HAMR slider including a slider substrate; and
    a HAMR head disposed on the slider substrate, wherein the HAMR head includes:
       a write element; and
       a read element; and
    a laser disposed on the HAMR head, wherein the laser is configured to raise the temperature of the HAMR medium to reduce the coercivity thereof.

13. The HAMR medium of claim 12, wherein the data-storage device comprises a hard-disk drive (HDD).

14. A method for making a HAMR medium for heat assisted magnetic recording (HAMR), comprising:
    placing a substrate in a thin-film deposition tool;
    depositing a bi-layer, comprising:
       depositing a seed layer on the substrate; and
       depositing a thermal-transport-control layer (TTCL) on the seed layer;
    depositing a heat-sink layer on the TTCL; and
    depositing a magnetic-recording layer on the heat-sink layer,
    wherein the TTCL comprises CuX, wherein X is selected from the group consisting of $SiO_2$, $SiO_x$, $HfO_2$, $ZrO_2$, $TiO_2$, $TiO_x$, $Ta_2O_5$, $TaO_x$, $WO_3$, $WO_x$, and combinations thereof.

15. The method of claim 14, wherein the TTCL is deposited at a bias voltage of about −50 volts (V) to −450V applied to the substrate.

16. The method of claim 14, wherein the TTCL is deposited at a pressure of less than 5 milliTorr (mTorr) in an atmosphere comprising one selected from the group consisting of Argon (Ar) gas and a mixture of Ar gas and nitrogen gas, N2, the mixture determined by a flow rate of N2 gas of between about 2% to about 10% of the total combined gas flow rate of Ar and N2 gases together.

17. The method of claim 14, wherein the TTCL further comprises a material selected from the group consisting of Ni, Si, Cr, Zr, Mg, Ag, Zn, Sn and combinations thereof.

18. The method of claim 15, further comprising:
depositing an adhesion layer on the substrate;
depositing an AUL on the heat-sink layer;
depositing an orientation-control layer on the AUL; and
depositing an overcoat layer on the magnetic recording layer.

19. A heat-assisted magnetic recording (HAMR) medium, comprising:
a substrate;
a bi-layer, comprising:
   a seed layer disposed on the substrate; and
   a thermal-transport-control layer (TTCL) disposed on the seed layer;
a heat-sink layer disposed on the TTCL; and
a magnetic-recording layer disposed on the heat-sink layer,
wherein the TTCL comprises a same material composition throughout the TTCL.

20. The HAMR medium of claim 19, wherein the TTCL has a thermal conductivity less than that of the heat-sink layer.

21. The HAMR medium of claim 19, wherein TTCL comprises Cu having a substantially face-centered cubic (FCC) crystal structure, and a (111) preferred orientation.

\* \* \* \* \*